United States Patent
Ryder

[15] 3,657,469
[45] Apr. 18, 1972

[54] ELECTRIC CABLE TERMINATION MODULES HAVING PEROXIDE-CURED ELASTOMERIC INSULATING BODIES AND A LOW-ELECTRICAL-RESISTANCE CONDUCTIVE COATING ON THE EXTERIOR THEREOF

[72] Inventor: Raymond B. Ryder, Rochester, N.H.

[73] Assignee: General Electric Company

[22] Filed: May 11, 1970

[21] Appl. No.: 36,051

[52] U.S. Cl..............174/73 SC, 260/80.78, 260/DIG. 28, 339/60 R, 339/143 C
[51] Int. Cl.............................................H02g 15/02
[58] Field of Search.................174/18, 73 R, 73 SC, 75 D, 174/80, 127, 110 P; 339/59 R, 60 R, 61 R, 136 R, 143 R, 143 C, 101, 102 R, 103 R, 111; 260/80.78, 88.2 S, DIG. 28

[56] References Cited

UNITED STATES PATENTS

| | | | |
|---|---|---|---|
| 3,110,623 | 11/1963 | Feild | 174/110 PM UX |
| 2,323,399 | 7/1943 | Jacobi | 174/73 R UX |
| 3,344,391 | 9/1967 | Ruete | 174/127 UX |
| 3,376,541 | 4/1968 | Link | 174/73 R X |
| 3,513,425 | 5/1970 | Arndt | 339/143 C X |
| 3,522,404 | 8/1970 | Trayer | 174/18 X |

FOREIGN PATENTS OR APPLICATIONS 1,059,550 2/1967 Great Britain..............174/DIG. 1

OTHER PUBLICATIONS

DuPont Nordel Hydrocarbon Rubber, Bulletin No. 6, Received in the Patent Office Scientific Library July 17, 1967, 12 pages total. TS– 1925– D95 no.
Jones, " An Oil Extended Ethylene-Propylene Rubber for Cable Insulations and Jackets," Wire, Nov. 1966, pages 1822 and 1824– 1826.

Primary Examiner—Laramie E. Askin
Attorney—Francis X. Doyle, Vale P. Myles, Frank L. Neuhauser, Oscar B. Waddell and Joseph B. Forman

[57] ABSTRACT

An electric cable termination module is formed of a peroxide-cured ethylene propylene terpolymer that is treated to form carbon-to-carbon cross linked bonds throughout the molecular structure of the elastomer. The peroxide-cured insulating module is characterized by being highly resistant to heat aging so that it retains the resilience necessary to form a water-tight seal with a cooperating cable. Also, this unique insulating material possesses excellent mechanical creep resistance properties that prevent the module from being distorted by mechanical loading over an extended period of time. The termination module is further characterized by the incorporation of an extraordinarily low-resistance, sulfur-curved elastomeric coating on predetermined portions of its interior and exterior surfaces to afford improved electrical shielding characteristics in combination with the desirable properties of the insulating material just identified. The electrical resistance of this coating remains stable when subjected to temperature variations of large magnitude.

14 Claims, 2 Drawing Figures

Patented April 18, 1972
3,657,469
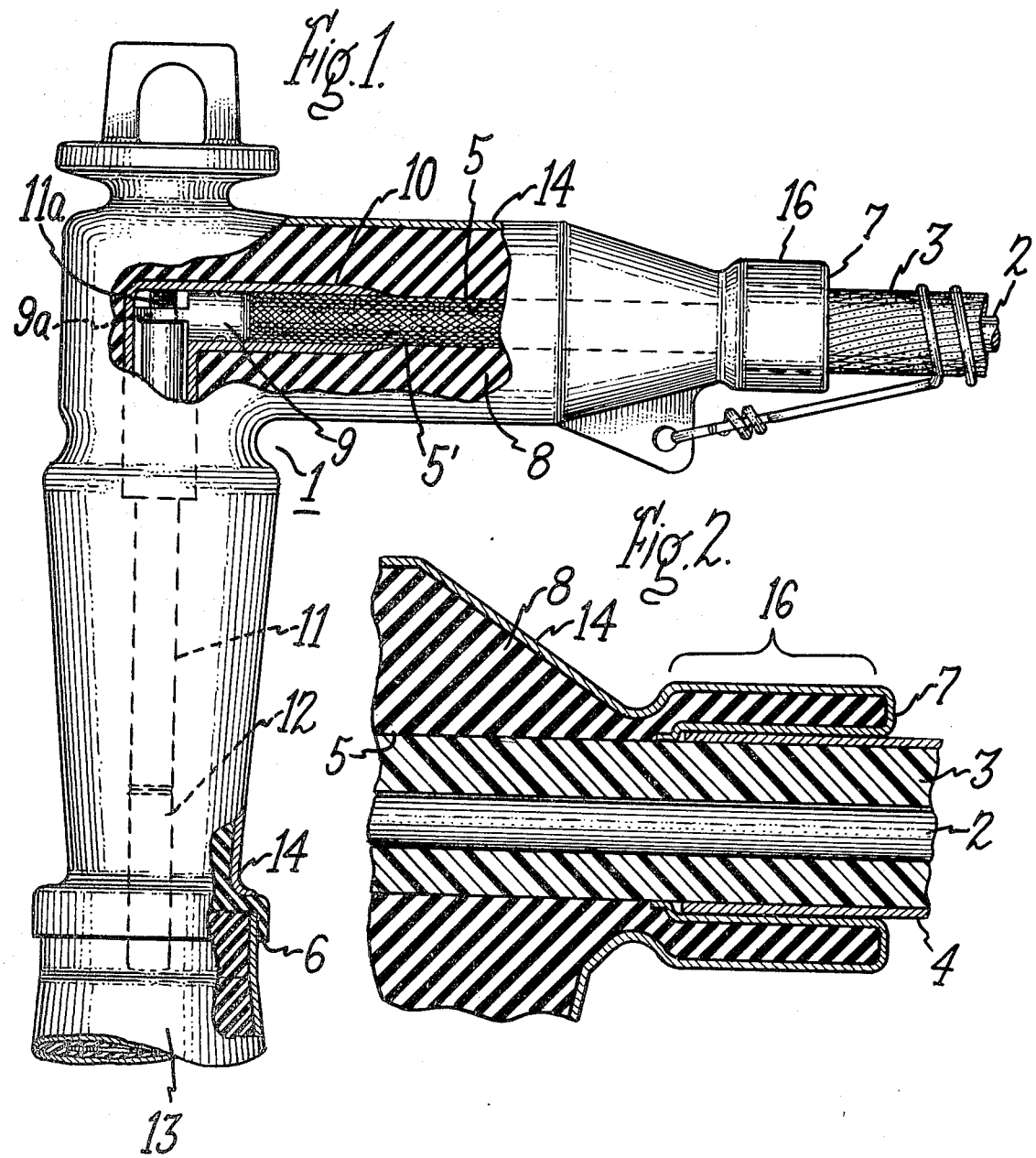
Inventor,
Raymond B. Ryder,
by Vale P. Myles
His Attorney.

ELECTRIC CABLE TERMINATION MODULES HAVING PEROXIDE-CURED ELASTOMERIC INSULATING BODIES AND A LOW-ELECTRICAL-RESISTANCE CONDUCTIVE COATING ON THE EXTERIOR THEREOF

The use of elastomeric materials, such as Nordel, which is manufactured by E.I. DuPont Manufacturing Company, to form electric power cable termination modules is presently well known in the field of underground power distribution systems. U.S. Pat. No. 2,933,480—Gresham et al., issued Apr. 19, 1960 and assigned to E.I. duPont de Nemours and Company, discloses several examples of materials that are known by the identifying term "Nordel." In fact, even before the use of such easily transportable cable termination modules became common in electric power distribution systems, the use of elastomeric cable terminations had enjoyed wide acceptance in connection with underground telephone cable systems and underground airport lighting systems. As a consequence, prior to the present invention, a substantial history of engineering experience with the problems presented by underground electric cable systems termination modules had been accumulated. For example, it was well known that cable termination modules in underground electric power distribution systems would normally be subjected to significant mechanical stresses over long periods. Accordingly, engineers undertaking the design of underground distribution systems for electric power realized from the outset that it would be desirable to form the elastomeric materials for the cable connector modules of such systems from compounds that would have good mechanical creep resistance so that the modules would not become distorted under mechanical loading conditions and thereby permit moisture to enter the electric cable junctions sealed by the modules. In addition, it was apparent to those skilled in the art that it was necessary to form such cable termination modules of materials that would provide good voltage grading and electrical shielding around the electrical junctions they house. Also, because a substantial number of cable connector modules would, obviously, be required on the underground power distribution systems of the numerous electric utility companies throughout the nation, it was recognized by the underground systems development engineers that such high volume use demanded the implementation of cost economies in formulating and manufacturing such modules for their industry.

With such well known parameters in mind, electrical engineers and chemists working together in the development of suitable cable termination modules for high voltage electric power distribution systems developed a sulfur-cured elastomeric material for forming the insulating body of such termination modules. To provide shielding for these prior art modules, a somewhat similar sulfur-cured elastomeric material was developed to form relatively thick, molded conductive shields around the insulating bodies of the modules. Such shields provide a continuation of the electrical ground plane between the cables being connected in the system by the modules. An example of such a prior art cable termination module is shown in U.S. Pat. No. 3,344,391, which was issued Sept. 26, 1967 and is assigned to Elastic Stop Nut Corporation of America (now a Division of Amerace-Esna Corporation). Although such cable termination modules have enjoyed wide commercial application during the last several years, it has been found that the present invention provides cable termination modules that are superior in several important regards to these prior art devices.

One particular problem that has been noted with prior art sulfur-cured elastomeric cable termination modules is that they tend to become relatively hard or brittle after being aged for an extended period of time at relatively high temperatures, i.e. temperatures approaching or in excess of 125° C. Thus, seepage of moisture into prematurely hardened or mechanically cracked termination modules may become a significant maintenance problem on systems utilizing these prior art devices. A related but perhaps subtler problem that has been detected in cable termination modules of this prior art type, which utilizes a sulfur-cured insulating body, stems from the tendency of such modules to relax mechanically so they yield to constant mechanical loading pressure of the kind often exerted on the modules by the weight of thick, relatively heavy electric cables connected to them. Such mechanical relaxation of a module can also result in moisture seepage around the module into contact with the cable it is intended to protect so that a line-to-ground fault might occur on the system. In addition to these formidable disadvantages, it has been found that prior art sulfur-cured elastomeric insulation for termination modules tends to become bonded together with the insulation of other modules or with the insulation of a cable on which the modules are coupled. Such bonding not only creates a nuisance by making the termination joint difficult for a lineman to open, but also usually results in destruction of the module when such opening of the junction is required. Of course, such destruction prevents continued re-use of the module and, therefore, adds undesirably to maintenance expense of the system on which the module is employed.

A further disadvantage of prior art connector modules for underground electric power distribution systems is that the electrically conductive coatings commonly used on their outer surfaces are either undesirably high in electrical resistance, or the coatings are so thick (to obtain lower electrical resistance) that they must be formed by an undesirably expensive manufacturing process, such as a secondary molding process. In addition, the electrical stability of such prior art coating has generally been undesirably susceptible to variation of unwanted magnitude when the coating is subjected to heat aging at temperatures in the neighborhood of 125° C.

A primary object of the present invention is to provide a cable termination module that provides effective voltage grading and moisture sealing functions while avoiding the above-identified disadvantages of prior art cable termination modules.

Another object of the invention is to provide a unique elastomeric insulating compound for utilization in the manufacture of the insulating housing portion of an underground electric cable termination module.

Yet another object of the invention is to provide an electric cable termination module that possesses both high mechanical creep resistance and excellent heat aging properties.

Still another object of the invention is to provide a cable termination module formed of a resilient elastomeric material that does not readily absorb lubricating liquids, so that such liquids can be used effectively to prevent the module from sticking to electric cables or other modules used in combination with it.

A further object of the invention is to provide an electric cable termination module having an insulating body portion formed of a peroxide-cured elastomeric compound and also having a coating of low electrical resistance, temperature stable, conductive material mounted on predetermined portions of the surfaces of the insulating body of the module.

A still further object of the invention is to provide an improved manufacturing process for making electric cable termination modules that have characteristic properties superior to prior art modules and are efficient to manufacture commercially.

In one preferred embodiment of the invention, a module for terminating an insulated electric cable is manufactured by a novel thermal molding process. The module thus formed has an insulating body of predetermined configuration which is made from a peroxide-cured ethylene propylene terpolymer compound, and the exterior surface of this insulating body is coated with a thin, light weight, temperature stable, sulfur-cured elastomer that has a very low electrical resistance per square unit thereof. In addition, a similar sulfur-cured, electrically conductive coating is mounted on predetermined portions of a passageway through the module so that cable connectors within this passageway are electrically shielded to prevent entrapped air from forming corona discharges within the module. In one embodiment of the invention, hydrated alumina is compounded with the insulating body portion of the termination to further improve the mechanical creep resistance of the module.

Additional objects and advantages of the invention will become apparent to those skilled in the art from the description of it that follows, taken in connection with the accompanying drawings, in which:

FIG. 1 is a side elevation, partly in cross-section, of an electric cable termination module constructed pursuant to the present invention and shown with respect to both an electric cable on which it is mounted and a second conductor termination module to which it is connected.

FIG. 2 is an enlarged cross-sectional view of a portion of the cable termination module shown in FIG. 1, again illustrated with respect to an insulated cable on which the module is mounted.

Referring now to FIG. 1 of the drawing, there is shown an electric cable termination module 1 that is adapted to be manually assembled on one end of an insulated high voltage electric cable 2. For the purpose of describing the present invention, it need only be understood that the cable 2 is provided with one or more layers of suitable insulating material 3 (see FIG. 2) on the outer surface of which there is an electrically conductive ground shield 4. Conventional materials may be used to form all of the foregoing cable components 2, 3, 4, since they do not form an important aspect of the present invention.

It should also be understood that while a single configuration is depicted herein for the cable termination module 1, obviously other cable configurations, such as T-taps, loadbreak connectors or simple cable splicing modules can be manufactured using the teaching of the present invention. The module 1 comprises an elongated housing in the shape of an elbow which is formed by a process that is described below, of mechanically resilient, electrical insulating material that has a unique composition which will be described in more detail hereinafter. A generally annular passageway 5 of varying diameter is defined by suitable wall means 5' through the module 1 from one end 6 to another end 7 thereof. The wall means 5' in this form of the invention is simply the interior surface of the body of insulating material 8 that forms the major portion of module 1. Positioned within the passageway 5, adjacent the midpoint of it, is a metal contact member 9 that is crimp connected onto an end of the cable 2 to serve as an end terminal for the cable. Also, mounted within the passageway 5 is an elastomeric, electrically conductive sleeve 10 that extends beyond both ends of the metal contact 9 to completely shield the mechanical junction between contact 9 and the end of cable 2, and the junction between contact 9 and a conductor 11. This conductive sleeve is firmly bonded to the major insulation 8 so that no corona inducing air voids exist between the interface of the major insulation and the conducting sleeve. The other end of contact 9 is electrically and mechanically connected to an elongated conductor 11, which may be a copper rod having a threaded end 11a that is rotatably secured in a cooperatively threaded aperture 9a in contact 9. An arc-quenching rod member 12 is mounted on the end of conductor 11 in any suitable manner. The conductor 11 is adapted to be inserted into a cooperating resilient bore-type contact (not shown) mounted in a conductor bushing or in another cable termination module, such as the module 13 to which the module 1 is connected in the arrangement depicted in FIG. 1.

In addition to these fundamental structural elements of module 1, pursuant to the present invention, substantially the entire outer surface of module 1 is covered with an elastomeric, paint-type coating 14 (shown in enlarged detail in FIG. 2) of sulfur-cured, electrically low resistance per square unit, thermally stable conductive ethylene propylene terpolymer. It should be understood that preferably the unique compound used to form the coating 14 is also used to make the sleeve 10 that is molded into passageway 5.

A desirable characteristic of the cable termination module 1 of the present invention is its ability to provide a lasting, water-tight seal along the passageway 5, around the insulation 3 and conductive shield 4 of cable 2. To help achieve this seal, the module 1 is tapered conically to a small-diameter cylindrical portion 16 that is resiliently dilatable and can be expanded to accommodate a predetermined range of slightly larger diameter cables, such as the cable 2, that is shown positioned in passageway 5 of the preferred embodiment of the invention being described. Of course, in addition to providing a water-tight seal at the time that the module 1 is mounted in operating position on the end of cable 2, it is most desirable to form the module 1 of a material that will maintain its dilatable resilience and, therefore, maintain an effective seal over an extended period of normal use of the module 1. A primary objective of the present invention is to provide such a desirable insulating material 8 for the body of module 1 so that extended heat aging of this material at elevated temperatures in the neighborhood of 125° C, which may be encountered on high power electric distribution systems, will not harden the main body of insulating material 8, or the particularly flexible cylindrical portion 16 thereof, causing it to become embrittled to a degree such that it might be cracked if relative movement occurs between the cable 2 and the module 1 when these components of the system are manually manipulated. Also, as noted above, it may frequently occur during normal use of the termination module 1 that the cable 2 will exert an appreciable mechanical loading stress on the resilient insulating material 8 of the module 1, due to the weight of the cable 2 or due to the inherent resilience of the cable if it is coiled or bent in a manner that would bias it against the sidewalls of passageway 5 of the module 1. To prevent such prolonged mechanical loading by the cable 2 from causing the insulating material 8 of module 1 to relax mechanically and creep, and in order to avoid undesirable heat aging of the insulating material 8, the present invention utilizes a unique peroxide-cured ethylene propylene terpolymer compound that is molded and cured by a carefully prescribed process to form a module that is highly resistant to such mechanical creepage and heat aging problems. Thus, with the present invention, the module 1 is rendered relatively impervious to the risk of moisture leaks occurring around its resiliently dilatable portion 16 even when the cable 2 imposes a sustained mechanical force on the module.

Pursuant to the present invention, the insulating body 8 of module 1 is formed of a compound made up of constituents that enable a suitable peroxide-cured elastomer to be manufactured. One preferred example of such a compound is shown in Table I, below, which identifies constituents that are pursuant to the invention, uniformly mixed together to make a moldable process batch in the relative proportions, by weight, that are also indicated in this table:

TABLE I

| Constituent | Parts by weight | Source (where tradename is used) |
|---|---|---|
| Nordel 1040 | 100.00 | E. I. DuPont Mfg. Co. |
| EPC Black | 10.00 | United Carbon Co. |
| Alumina trihydrate C-710 | 180.00 | Aluminum Co. of America |
| Sun Par No. 2280 | 30.00 | Sun Oil Company |
| Vinyl Silane A172 | 4.00 | Union Carbide Corp. |
| Paraffin | 5.00 | Boler Petroleum Corp. |
| Age Rite Resin D | 1.50 | R. T. Vanderbilt Co. |
| Zinc oxide | 5.00 | American Zinc Sales |
| Rodo No. 4 | 0.10 | R. T. Vanderbilt Co. |
| TLD No. 90 | 4.00 | Lincoln Laboratories |
| Sulfur | 0.50 | H. A. Schlosser Co. |
| Di Cup 40C 40% active dicumyl peroxide | 10.00 | Hercules Powder, Inc. |

The constituents designated in Table I above and in Table II that follows in the specification, which are designated by trade names for convenience to those familiar with the chemical industries, are also identified in the following table, Table I-A, by their appropriate generic names:

TABLE I-A

| Constituent | Genetic Name |
| --- | --- |
| Nordel No. 1040 | Terpolymer consisting of ethylene, propylene and 1–2% mole unsaturation. |
| EPC Black | ASTM D1765 type S–300 |

| Constituent | Genetic Name |
| --- | --- |
| Aluminum Trihydrate | Aluminum Oxide with 3 water molecules of hydration (aluminum hydroxide) |
| Sun Par No. 2280 | Low vapor pressure mineral oil |
| Vinyl Silane A172 | Vinyl Tris—2—Methoxy Ethoxy Silane |
| Age Rite Resin D | Polymerized trimethyl dihydroquinoline |
| Rodo No. 4 | Blends of oil used as reodorant |
| TLD No. 90 | 90% litharge dispersed in 10% EPDM |
| DiCup No. 40C | 40 parts DiCumyl Peroxide and 60 parts inert clay |

Those skilled in the art should recognize that other suitable gums of the ethylene propylene terpolymer family are commercially available which, with minor proportional weight adjustments to allow for stoichiometric unsaturation differences in compound constituents may be substituted for the listed Nordel polymer identified in the table above. For example, using the Ziegler process, there are several nonconjugated dienes that can be used with ethylene propylene copolymers to form a suitable terpolymer. In practicing the invention with such a terpolymer, only one or two mole percent diene addition is necessary for vulcanization. Examples of suitable dienes for this purpose are listed below:

| Genetic Name | Carbon backbone structure |
| --- | --- |
| 1,4-Pentadiene | C=C—C—C=C |
| 1,4-Hexadiene | C=C—C—C=C—C |

| Genetic name | Carbon backbone structure |
| --- | --- |
| 6-Methyl-1,5 heptadiene | C=C—C—C—C=C—C<br>                       \|<br>                       C |
| 5-methylene-2-norbornene | 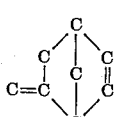 |
| 5-alkenyl-2-norbornene | 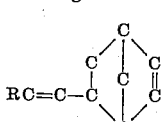 |
| 2,5-norbornadiene | 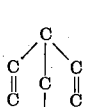 |
| 1,5-cyclooctadiene | 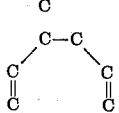 |
| 2-alkyl-2,5-norbornadiene | 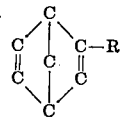 |
| Dicyclopentadiene | 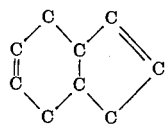 |

Of these listed dienes, the most common commercially available ones are terpolymers comprised of ethylene propylene and 1,4 Hexadiene or Dicyclopentadiene.

It must also be appreciated in practicing the present invention that all peroxides are not suitable for compounding the novel insulating material 8, because some are decomposed by certain of the primary constituents of this unique compound, such as carbon black, metal oxides and amines. Peroxides of this unsuitable class, such as carbonyl, benzoyl and most hydroperoxides, are, accordingly, not readily usable in mixing compounds for my invention. Acceptable peroxides for practicing the invention are those which are basically responsive to temperature change and generally follow a straight-line plot when the logarithm of the elapsed time for one half life decomposition of the peroxide is plotted against the reciprocal of its absolute temperature. Examples of such a suitable class of peroxides are alkyl and arylalkyl peroxides such as ditertiary butyl peroxide and dicumyl peroxide. Furthermore, it will be appreciated that the dicumyl peroxide listed in Table I is only 40 percent active, in that it has been premixed with 60 percent inert clay filler. Of course, as an alternative in formulating the compound described in Table I, 100 percent active dicumyl peroxide could be used, provided proper stoichiometer weight adjustments are made in a manner well understood by those skilled in the art.

Typical rates for one half life decomposition of peroxides suitable for use in the compounds of my invention, as taught by Table I, are listed below. These values when plotted as the logarithm of time and reciprocal of absolute temperature produce a generally straight line.

| Temperature °C | Decomposition of half life (time in seconds) |
| --- | --- |
| 150 | 1260 |
| 160 | 427 |
| 170 | 148 |
| 180 | 58.9 |
| 190 | 22.9 |
| 200 | 9.8 |

It will also be apparent to those skilled in the art that certain co-agents and peroxide decomposition promoters can be used to lower the decomposition temperature of the above described suitable peroxides, such as the preferred dicumyl peroxide, to thereby accelerate the cure rate while maintaining compound processing safety. Examples of such promoters are E. I. DuPont Manufacturing Company's, H.V.A.-2 activator, certain Methacrylate resins similar to those manufactured by Sartomer Resins Inc. and Tri-Allyl-Cyanurate, manufactured by American Cyanamid Company.

It should also be understood that sulfur is unnecessary in a composition that is peroxide-cured pursuant to the invention. Moreover, due to the acidity of sulfur, it must be realized that it has a tendency to retard decomposition of the peroxide used in such compounding. The reason for using sulfur in the preferred formulation listed in Table I is to promote adhesion, during cure, to substrants and cured conducting ethylene propylene terpolymer used in the termination module construction of the invention. It has been found that this desirable objective can be consistently obtained without injury to the insulating material 8 when the sulfur content is not allowed to exceed 5 parts per 100 parts (by weight) of Nordel 1040.

It will be apparent to those skilled in the art that the sample compound designated in Table I includes many constituents that are identical to, or similar to, those constituents often used in compounding a sulfur-cured elastomeric material suitable to use in the manufacture of elastomeric termination modules for electric cables. In order to provide a convenient reference basis for comparing the compound of the present invention with such prior art sulfur-cured compounds, there is shown in Table II, below, the constituents and relative proportions thereof of a typical sulfur-cured elastomeric compound similar to those now being used in the prior art to form cable termination modules.

TABLE II

| Constituent | Parts by weight | Source (where tradename is used) |
| --- | --- | --- |
| Nordel 1040 | 100.00 | E.I. DuPont Mfg. Co. |
| EPC Black | 10.00 | United Carbon Co. |
| Whitex | 180.00 | Burgess Clay Co. |
| Sun Par No. 2280 | 30.00 | Sun Oil Company |
| Vinyl Silane A172 | 4.00 | Union Carbide Corp. |
| Paraffin | 5.00 | Boler Petroleum Corp. |
| Age Rite Resin D | 1.50 | R.T. Vanderbilt Co. |
| Zinc oxide | 5.00 | American Zinc Sales |
| Stearic acid | 1.00 | Emery Industries |
| Sulfur | 2.00 | H.A. Schlosser Co. |
| MBTS (Altax) | 1.50 | R.T. Vanderbilt Co. |
| Methyltuads | 0.80 | R.T. Vanderbilt Co. |
| Tellurac | 0.80 | R.T. Vanderbilt Co. |
| Sulfads | 0.80 | R.T. Vanderbilt Co. |

It can be seen from a comparison of Tables I and II that the differences in composition between the sample sulfur-cured compound of the prior art (Table II) and the peroxide-cured compound of the invention (Table I) reside primarily in substituting dicumyl peroxide for the Altax, Methyltuads, Tellurac and Sulfads that are normally used in various proportions and combinations to produce a sulfur-cured compound that is suitable for use in making cable termination modules. It is generally known that in sulfur curing of ethylene propylene terpolymers the more effective primary accelerators are mono and tetra sulfides of thiuram, and metal salts of dithiocarbamic acid; and Thiazoles are effective as secondary accelerators to promote speed of cure. However, it has been found that regardless of the manner in which the constituents of any sulfur-cured compound are varied, or the compounding process is accelerated, the resultant compounds are all inferior to the novel peroxide-cured compounds of the invention both in mechanical creep and heat aging properties.

In the preferred compound of the invention, in addition to the differences just noted relative to a typical sulfur-cured insulating compound, trihydrated-alumina ($Al_2O_3$—$3H_2O$) is used in place of ordinary filler clay, Whitex or silica flour or mixtures thereof, because it has been found that the use of alumina in such compounds, in a range that comprises between 20 percent and 70 percent by weight of the compound, very appreciably improves the mechanical creep resistance of the resultant insulating material 8 for module 1.

After the constituent materials of the invention have been uniformly mixed into a batch of desired size, pursuant to the invention, this batch is further processed by molding it under a given pressure and at a predetermined temperature which are sufficient to exhaust at least three half lives of the dicumyl peroxide, or other suitable peroxide agent that may be used to cure the insulating material. In practice, I have found that an insulating compound 8 that is particularly suitable for making cable termination modules can be formed by curing the mixed batch of material at the selected temperature and pressure until seven half lives of the dicumyl peroxide are exhausted. In order to insure an optimum molding step in practicing my invention to form cable modules, i.e., to insure that seven half lives of the peroxide are expended during the molding step, an operator should periodically monitor temperature within the mold through thermocouple surveys of the actual ethylene propylene terpolymer time—temperature profile during the molding process. The data thus obtained is then used with graphical integration techniques to insure that the elastomer is held the proper time at the desired given temperature to effect seven half lives of peroxide decomposition. Depending on shape and size of the module being cured, the optimum time required is normally between 6 and 15 minutes with mold heaters maintained at 190° C and with a pressure on the elastomer of no less than 500 P.s.i. Finally, pursuant to the unique process of the present invention, following the foregoing molding step in the process, the module 1 is heat aged for at least 8 hours so that remaining peroxide decomposition products are purged from the insulating material 8 to prevent them from interfering with subsequent curing of the electrically conductive coating 14 that will be mounted on the outer surface of the module 1. This heat aging operation is performed by maintaining the module 1 at a temperature in the range of 100° to 125° C for at least 8 hours.

The preferred compound of Table I produces an insulating material 8 after the above-described optimum molding step of my process that, in its cured state, contains at least 0.05 percent but less than 0.2 percent by weight of free peroxide. Also, I have found that the insulating material 8, thus formed, is highly resistant to absorption of silicone lubricants placed on its surface. Therefore, since such lubricants are normally used on cable termination modules to prevent them from sticking together or sticking to a cable on which they are mounted, the function of the lubricants is protected, rather than being destroyed in the manner frequently encountered with prior art, sulfur-cured modules, which absorbed the lubricants, thereby causing these modules to "sieze" in contact with other modules, and be destroyed when forced apart.

After the molding and aging step at 100°–125° C that forms the body of insulating material 8 of module 1, a thin coating 14 of sulfur-cured elastomeric material is bonded to substantially the entire outer surface of the module 1 by either spraying or dip-forming this material onto predetermined portions of the outer surface of the module 1. In order to make the coating 14 of low electrical resistance per square unit, while assuring its electrical stability under temperature cycling conditions, a novel sulfur-cured compound is provided pursuant to the invention for making the coating 14. The constituents and proportions of one preferred form of this compound are listed in Table III. Thus, with the coating 14 in place, a unique cable termination module 1 is formed in which a highly creep resistant insulating material 8, having excellent heat-aging properties that prevent it from losing its inherent resilience, is provided in combination with a coating 14 of sulfur-cured elastomeric conductive material that has good electrical conducting properties and excellent heat aging properties to perform its intended shielding function. Because of the low electrical resistance of 300 ohms to 3,000 ohms per square unit of the novel compound used to form coating 14, it is important to realize that it can be less than 20 mils thick and still have a resistance of less than 2,500 ohms per square. Preferably, the coating 14 is about 5 mils thick but a coating of 2 to 3 mils in thickness has been found to also satisfy the objective of the invention. Thus, a desirably thin and light-weight coating can be formed that is superior in these respects to prior art shielding coatings which generally must be so thick that a separate molding operation is needed to form them. Moreover, the mechanical flexibility of the coating 14 of my invention is preserved, and it's electrical resistance is maintained at less than 2,000 ohms per square unit thereof when the coating is subjected to heat aging at temperatures in excess of 90° C. In one form of the coating of the invention, the coating is formed of a plurality of separately applied layers that are heat aged together thereby to form an integral, continuous coating on substantially the entire outer surface of said housing, the electrical resistance of said coating being less than 1,000 ohms per square unit thereof.

A characteristic feature of the body of insulating material 8 formed pursuant to the compounding and curing teachings of the present invention resides in the fact that a major portion of the molecular structure of the insulating material 8 is cross linked by carbon-to-carbon bonds and the amount of sulfur in the compound is at least 0.05 percent by weight but less than 0.3 percent by weight of the total compound materials. In fact, although it will be apparent to those skilled in the art that various modifications can be made in the particular percentages of constituents illustrated in Table I above, an optimum compound for insulating material 8 results with the particular percentage of constituents shown in Table I, in that this compounding and the above-described curing process results in the insulating material 8 having at least four times more carbon-to-carbon bonds in its molecular structure than the number of poly-sulfide bonds that exist in the structure. Accordingly, since these carbon-to-carbon bonds are much more creep resistant than polysulfide bonds, which tend to relax mechanically under stress, the resultant cable termination module 1 constitutes a major improvement over prior art cable termination modules.

A preferred sulfur-cured formulation for making the preferred embodiment of the conductive coating 14 described above is listed below in Table III.

TABLE III

| Constituent | Parts by weight Sleeves (10) | Coating (14) | Source, (where tradename is used) |
| --- | --- | --- | --- |
| Nordel No. 1320 | 100.00 | | E. I. du Pont Mfg. Co. |
| Epsyn No. 55 | | 100.00 | Copolymer Rubber & Chemicals Corp. |
| XC-72 Black | 90.00 | 90.00 | Cabot Corp. |
| Sun Par No. 2280 | 45.00 | 45.00 | Sun Oil Co. |
| Vinyl Silane SC-3933 | 4.00 | 4.00 | General Electric Co. |
| Paraffin | 5.00 | 5.00 | Boler Petroleum. |
| Age Rite Resin D | 1.50 | 1.50 | R. T. Vanderbilt. |
| Hypalon No. 40 | 5.00 | 5.00 | E. I. du Pont Mfg. Co. |
| Zinc oxide | 20.00 | 20.00 | American Zinc Sales. |
| Stearic acid | 1.00 | 1.00 | Emery Industries. |
| Sulfur | 0.80 | 0.80 | H. A. Schlosser Co. |
| Altax | 1.00 | 1.00 | R. T. Vanderbilt. |
| Methyl tuads | 0.50 | 0.50 | R. T. Vanderbilt. |
| 80% active tellmac | 1.00 | 1.00 | R. T. Vanderbilt. |
| Eptac 4 | 2.00 | 2.00 | E. I. du Pont Mfg. Co. |

In addition to the generic names that are identified in Table I-A above, for some of the constituents identified at the beginning of Table III, the following Table III-A identifies the remaining constituents of Table III that are referred to by trade names for the convenience of those familiar with the chemical industry:

TABLE III-A

| Constituent | Genetic Name |
| --- | --- |
| Epsyn No. 55 | EPDM polymer using a Norborene type third polymer. Approx. 10 mole % unsaturation, approximately |
| Nordel No. 1320 | Similar to 1040 except improved flowability. (Difference is in ethylene propylene ratio.) |
| XC-72 | ASTM D1765 type N472 carbon black |
| Vinyl Silane SC-3933 | (Same as A-172 except from different vendor) |
| Hypalon No. 40 | Chlorosulfonated polyethylene |
| Altax (MBTS) | Benzothiazyl disulfide |
| Methyl Tuads (TMTDS) | Tetramethylthiuram disulfide |
| 80% Active Tellurac | 80 parts Tellurium diethyldithiocarbamate, 20 parts inert filler |
| Eptac 04 | Zinc dibutyl dithiocarbamato |

A unique feature of the unique conducting compound of Table III is the type and amount of XC-72 Black loading that it contains. Recognizing the impact of this feature, those skilled in the art will be able to formulate equivalently advantageous compounds. For example, it should be noted that in order to obtain conductivity in the order of 500 ohms per square unit surface resistivity, the carbon black used in this compound of the invention must have very high surface area per granule, as well as possessing high structural strength. Such a carbon black that is suitable to practice the invention is: Cabot's XC-72, which has a surface area-to-volume of granule that is generally equivalent to the A.S.T.M. designation, D1765 type N472. Generically, the preferred carbon black used in the invention can be described as having a surface area of at least 150 square meters per gram of granulated carbon, and more specifically, the carbon black of the most preferred embodiment has a surface area per volume in the range of 225 to 285 square meters per gram of carbon, and it must be present in the disclosed compound in an amount of no less than 65 parts per 100 parts by weight of the ethylene propylene terpolymer listed in Table III. When mixed in the ratios shown in Table III, the conducting coating 14 will have good mechanical flexing, heat, aging and outdoor environmental aging properties, while maintaining electrical conductivity in the order of 500 ohms per unit surface resistivity.

A preferred method for making the conductive coating 14 is to blend the constituents shown in Table III in any suitable manner, for example by using conventional rubber compounding equipment, such as Banbury or rubber mill type mixers. After which, the compounded elastomer is shredded and blended with a suitable solvent, such as mineral spirits, using conventional paint making equipment. This resulting conducting paint may then be applied by brush, dip or spray applicators to the peroxide cured major insulation 8. The applied conducting paint is then preferably oven cured in dry heat in accordance with one of the following time-temperature arrangements.

| Temperature °C | Time in Hours |
| --- | --- |
| 100 | 9 |
| 125 | 7 |
| 150 | 3 |

These values are time at temperature of the paint and not total oven time. In addition, these listed values are generally minimum requirements, so until an optimum time is developed for a given application, it is advisable to over cure rather than under cure.

In order to obtain good conductivity in the outer conductive shield of prior art modules, as well as good mechanical creep resistance and heat aging properties, it has been a common practice to utilize a thick, molded sleeve around the insulating body of the module, rather than to utilize a thin coating, such as the dip-formable coating 14 disclosed herein. This practice is expensive and presents the risk of entrapping air or forming voids in the interface between major insulation 8 and such a molded conductive sleeve with possible subsequent damaging corona formation. Furthermore, on prior art modules that have used thinner conductive shield coatings, the conductivity of the coatings has been generally in the order of 50,000 to 100,000 ohms surface resistivity. Such coatings, although providing suitable service as a ground plane, may not provide the optimum protection afforded by my invention when circuit failure occurs within the major insulation of the module. For example, the 50,000 to 100,000 ohms resistive coatings may not allow sufficient current flow to operate fault protective devices. Consequently, on failure of the major insulation in modules with such high resistance coatings, the ground coating could be placed at high electrical potential and thereby present a safety hazard to workmen. My invention, with its lower electrical resistance conductivity coating 14, on failure of the major insulation 8 within the module, will allow sufficient current to flow through the coating to open safety devices. In addition, my invention is much more practical to produce because the conductive coating 14 can be formed with a less expensive manufacturing process that has the further advantage of eliminating the danger of corona forming voids being present between the coating 14 and insulation 8.

Those skilled in the art will recognize that the invention described herein can be modified and improved to develop different embodiments of it and it is intended that such embodiments will be encompassed within the following claims.

What I claim and desire to secure by Letters Patent of the United States is:

1. An electric cable termination module adapted to be manually assembled on one end of an insulated high voltage cable under field conditions, said module comprising an elongated housing of mechanically resilient, electrical insulating material, wall means defining a passageway through said housing, said passageway being resiliently dilatable at least adjacent one of its ends thereby to afford a water-tight seal between its dilatable walls and an insulated cable of larger diameter than the diameter of the dilatable passageway when said cable is inserted into the passageway, said insulating material being a peroxide-cured ethylene propylene terpolymer compound having a major portion of its molecular structure cross-linked with carbon-to-carbon bonds that are stable under heat aging conditions, whereby the mechanical resilience of said dilatable water-tight seal is maintained during heat aging of the insulating material, said insulating material comprising a compound that contains between 20 percent and 70 percent by weight of aluminum trihydrate.

2. An invention as defined in claim 1 wherein said insulating material contains at least 0.05 percent but less than 0.3 percent by weight of sulfur and has at least four times more carbon-to-carbon bonds in its molecular structure than the number of polysulfide bonds in said structure, thereby to make the insulating housing resistant to mechanical creepage when it is subjected to mechanical loading.

3. An invention as defined in claim 2 wherein substantially all of the insulating material in said housing is cross-linked with carbon-to-carbon bonds, and a major portion of the sulfur in said material is in a free state.

4. An invention as defined in claim 2 including an electrically conductive resilient coating of elastomeric material mounted on the outer surface of said housing over a major portion thereof, said coating being formed of a sulfur-cured ethylene propylene terpolymer compound having a carbon black filler that comprises at least 65 parts for every 100 parts by weight of the ethylene propylene terpolymer in said compound, a major portion of the molecules of the coating being cross-linked with polysulfide bonds thereby to retain the mechanical flexibility of the coating when it is heat aged at temperatures in excess of 90° C, and wherein said coating, when applied and cured, is between 5 mils and 20 mils thick and has a surface resistance in the range of 300 to 2,000 ohms per square unit.

5. An invention as defined in claim 2 including an electrically conductive, resilient sleeve member of elastomeric material mounted on the inner surface of a predetermined portion of said passageway adjacent the midpoint thereof, said sleeve member being a sulfur-cured ethylene propylene terpolymer compound having a major portion of its molecular structure cross-linked with polysulfide bonds.

6. An invention as defined in claim 1 wherein said insulating material in its cured state contains at least 0.05 percent but less than 0.2 percent by weight of free peroxide.

7. An electric cable termination module as defined in claim 1 wherein said ethylene propylene terpolymer compound comprises an ethylene propylene copolymer combined with one to two mole percent of a nonconjugated diene to effect its vulcanization, whereby a module is formed that is highly resistant to absorption of silicone lubricants applied to the surface thereof.

8. An electric cable termination module as defined in claim 1 wherein the peroxide used to form said peroxide-cured ethylene propylene terpolymer comprises a peroxide that is basically responsive to temperature change such that a plot of the logarithm of elapsed time for one half life decomposition of the peroxide against the reciprocal of its absolute temperature forms a generally straight line.

9. The invention defined in claim 8 wherein said peroxide is taken from a class the includes alkyl and arylalkyl peroxides.

10. The invention defined in claim 8 wherein said peroxide is dicumyl peroxide.

11. An electric cable termination module that is adapted to be manually assembled on one end of an insulated high voltage cable under field conditions, said module comprising an elongated housing of electrical insulating material, wall means defining a passageway through said housing, said passageway being adapted to receive an electrical conductor therein and form a water-tight seal therewith, in combination with an electrically conductive resilient coating of elastomeric material mounted on the outer surface of said housing over a major portion thereof to form a low resistance electrical conductor that extends from a point adjacent one end of the housing to a second point adjacent the other end thereof, said coating being formed of a sulfur-cured ethylene propylene terpolymer compound having a carbon black filler constituent that comprises at least 65 parts for every 100 parts by weight of the ethylene propylene terpolymer in said compound, said carbon black having a surface area of at least 150 square meters per gram of granulated carbon, whereby the electrical resistance of said coating is maintained at less than 2,000 ohms per square unit thereof, and the mechanical flexibility of the coating is retained when it is subjected to heat aging at temperatures in excess of 90° C.

12. An electric cable termination module as defined in claim 11 wherein said conductive coating is less than 20 mils thick and is substantially uniform in thickness over its entire area.

13. An electric cable termination module as defined in claim 12 wherein said conductive coating is greater than 5 mils thick over substantially its entire surface area, and wherein the electrical resistance of said coating per square unit thereof is in the range of 400 to 3,000 ohms.

14. An electric cable termination module as defined in claim 11 wherein the carbon black has a surface area per gram in the range of 225 to 285 square meters per gram of carbon.

* * * * *